US 12,304,435 B2

(12) United States Patent
Ziolek et al.

(10) Patent No.: US 12,304,435 B2
(45) Date of Patent: May 20, 2025

(54) VEHICLE CHARGE PORT DEFROSTER

(71) Applicants: Hyundai Motor Company, Seoul (KR); Kia Corporation, Seoul (KR)

(72) Inventors: Scott Ziolek, Ann Arbor, MI (US); Jason J. Lilburn, Taylor, MI (US); Bryan Whaley, Howell, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 231 days.

(21) Appl. No.: 18/076,995

(22) Filed: Dec. 7, 2022

(65) Prior Publication Data

US 2024/0190392 A1 Jun. 13, 2024

(51) Int. Cl.
| | |
|---|---|
| *B60S 1/66* | (2006.01) |
| *B60L 1/02* | (2006.01) |
| *B60L 53/16* | (2019.01) |
| *B60L 58/12* | (2019.01) |
| *G05D 23/19* | (2006.01) |

(Continued)

(52) U.S. Cl.
CPC . *B60S 1/66* (2013.01); *B60L 1/02* (2013.01); *B60L 53/16* (2019.02); *B60L 58/12* (2019.02); *G05D 23/1902* (2013.01); *H05B 3/06* (2013.01); *H04W 4/40* (2018.02); *H05B 2214/02* (2013.01)

(58) Field of Classification Search
CPC .... B60L 1/02; B60L 5/02; B60L 50/50; B60L 53/16; B60L 58/12; B60L 58/24; B60L 58/27; B60L 2240/36; B60L 2240/62; B60L 2240/662; B60L 2240/70; B60L 2240/72; H04W 4/40; H04W 4/44; H04W 4/46; Y02T 10/64; Y02T 90/10; Y02T 90/12; Y02T 90/14; Y02T 90/16; B60Y 2200/91; B60Y 2400/302; H05B 1/0236; H05B 3/06; H05B 2214/02; B60W 2510/246; H01R 13/533; G05D 23/1928; G05D 23/1902; G05D 2105/12; B60S 1/023; B60S 1/66

See application file for complete search history.

(56) References Cited

U.S. PATENT DOCUMENTS

| | | | |
|---|---|---|---|
| 2017/0008375 A1* | 1/2017 | Blatchley | ............ H01M 10/615 |
| 2019/0217713 A1* | 7/2019 | Salter | ...................... B60L 53/16 |

(Continued)

FOREIGN PATENT DOCUMENTS

| | | |
|---|---|---|
| CN | 108657002 | 10/2018 |
| CN | 108674250 | 12/2018 |

(Continued)

*Primary Examiner* — Russell Frejd
*Assistant Examiner* — Brandon Z Willis
(74) *Attorney, Agent, or Firm* — Fox Rothschild LLP

(57) ABSTRACT

Methods, devices, and systems are described for charge port defrosters. The system includes a charge port integrated into a vehicle and configured to power the vehicle, a charge port cover coupled to the hinge and configured to cover the charge port, a heating element located proximate to the charge port and the charge port cover, and a controller. The controller is configured to determine whether the vehicle is in an environment capable of satisfying a temperature threshold. The temperature threshold is indicative of cold weather conditions. The controller is configured to operate the heating element to be powered in response to determining the vehicle is in the environment capable of satisfying the temperature threshold.

14 Claims, 9 Drawing Sheets

(51) Int. Cl.
*H04W 4/40* (2018.01)
*H05B 3/06* (2006.01)

(56) References Cited

U.S. PATENT DOCUMENTS

| | | | | |
|---|---|---|---|---|
| 2020/0001721 | A1* | 1/2020 | Merryweather | B60J 10/86 |
| 2020/0346550 | A1* | 11/2020 | VanDuyne | B60L 50/53 |
| 2021/0354592 | A1* | 11/2021 | Zuo | H01M 10/615 |
| 2023/0129663 | A1* | 4/2023 | Kim | H05B 3/34 |
| | | | | 49/70 |
| 2023/0322110 | A1* | 10/2023 | Lu | G01C 21/3438 |
| | | | | 701/410 |
| 2024/0079818 | A1* | 3/2024 | Burns | B60L 53/302 |

FOREIGN PATENT DOCUMENTS

| | | |
|---|---|---|
| CN | 110014946 | 7/2019 |
| JP | 2020156250 | 9/2020 |
| KR | 20130136290 | 12/2013 |
| KR | 101812150 | 12/2017 |
| WO | 2017206610 | 12/2017 |

\* cited by examiner

VEHICLE CHARGE PORT DEFROSTER

TECHNICAL FIELD

The present disclosure relates generally to vehicle charging, and more particularly, to defrosting charge ports.

BACKGROUND

Vehicles can freeze when exposed to cold weather conditions. The freezing conditions may interfere with charging electric vehicles. Electric vehicles require the batteries to be charged for prolonged periods of time. But charging the battery of electric vehicles in freezing conditions can cause difficulties, such as freezing the charger port. More specifically, the cold weather conditions can cause the charge port cover to freeze to the vehicle or the charger to freeze to the charge port. Although some vehicles may be charged inside garages, many electric vehicles are required to be charged outside of apartments, shopping areas, and work parking lots exposed to cold weather conditions capable of icy conditions.

In some cases, ice can accumulate over or behind the charge port cover. This ice obstructs access to the charge port. In some cases, the charger freezes to the vehicle while coupled to the charge port, preventing the removal of the charger at the charging station. Also, the charging port door can freeze over prior to charging. As such, systems and methods are needed for preventing cold weather conditions from interfering with charging the electric vehicle.

SUMMARY

The present disclosure provides methods, systems, articles of manufacture, including computer program products, for a charge port defroster.

In one aspect, there is provided a system including a charge port integrated into a vehicle and configured to power the vehicle, a charge port cover coupled to the hinge and configured to cover the charge port, a heating element located proximate to the charge port and the charge port cover, and a controller. The controller is configured to determine whether the vehicle is in an environment capable of satisfying a temperature threshold. The temperature threshold may be indicative of cold weather conditions. The controller is configured to operate the heating element to be powered in response to determining the vehicle is in the environment that can satisfy or is capable of satisfying the temperature threshold.

In some variations, the heating element is situated around an edge proximate to a charge port cover edge, wherein the heating element is proximate to the hinge, wherein the heating element surrounds the charge port, and wherein the cold weather condition is capable of producing icy conditions that interfere with at least one of charging the vehicle, accessing the charge port, or removing a charger from the charge port.

In some variations, the system further comprises a temperature sensor coupled to the vehicle, wherein the controller is communicatively coupled to the temperature sensor, the controller further configured to determine whether a temperature satisfies the temperature threshold based on the temperature sensor, the temperature threshold indicative of the temperature outside the vehicle and in response to determining the temperature satisfies the temperature threshold, operate at least one of a battery or a charger selectively coupled to the charge port to power the heating element, wherein determining the vehicle is in the environment capable of satisfying the temperature threshold is based on the temperature sensor. Additionally, determining whether the vehicle is in the environment that can satisfy or is capable of satisfying the temperature threshold is based on an external source including at least one of a wirelessly transmitted weather broadcast, a V2V communication, or a V2X communication.

In some variations, the system further comprises a battery having a power and a power sensor configured to measure power at the battery, wherein the controller is communicatively coupled to the battery and the power sensor, the controller further configured to determine the power satisfies a power threshold based on the power sensor, the power threshold indicative of the power in the battery and, in response to determining the vehicle is in the environment that can satisfy or is capable of satisfying the temperature threshold and determining the power satisfies the power threshold, operate at least one of the battery or a charger selectively coupled to the charge port to power the heating element.

In some variations, the system further comprises a global positioning system (GPS), wherein the controller is communicatively coupled to the GPS, the controller further configured to determine at least one of a location of the vehicle using the GPS or a destination of the vehicle based on a navigation system, the at least one of the location or the destination including a charging station and, in response to determining the vehicle is in the environment that can satisfy or is capable of satisfying the temperature threshold and determining the at least one of the location of the vehicle of the destination of the vehicle is associated with the charging station, operate at least one of a battery or a charger selectively coupled to the charge port to power the heating element. Additionally, the navigation system is configured to track whether charging stations are located at a set of destinations visited by the vehicle.

In some variations, the controller further configured to determine the vehicle is to charge within a time threshold based on at least one of the location of the vehicle or the destination of the vehicle, the time threshold indicative of a time in which the charging station is to be selectively coupled to the charging port and, in response to determining the vehicle is in the environment that can satisfy or is capable of satisfying the temperature threshold and determining the vehicle is to charge within the time threshold, operate at least one of the battery or the charger selectively coupled to the charge port to power the heating element. Additionally, the time threshold is adjusted based on a temperature determined by a temperature sensor.

In some variations, the system further comprises a battery having a power; and a power sensor configured to measure power at the battery, wherein the controller is communicatively coupled to the battery and the power sensor, the controller further configured to determine the power satisfies a power threshold based on the power sensor, the power threshold indicative of a low power in the battery, in response to the power satisfying the power threshold, generating a prompt to determine whether the heating element is to be powered, receiving a response to the prompt, the response indicative that the heating element is to be powered, and, in response to determining the vehicle is in the environment that can satisfy or is capable of satisfying the temperature threshold and receiving the response to the prompt, operate at least one of the battery or a charger selectively coupled to the charge port to power the heating element.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer-implemented methods consistent with one or more implementations of the current subject matter may be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
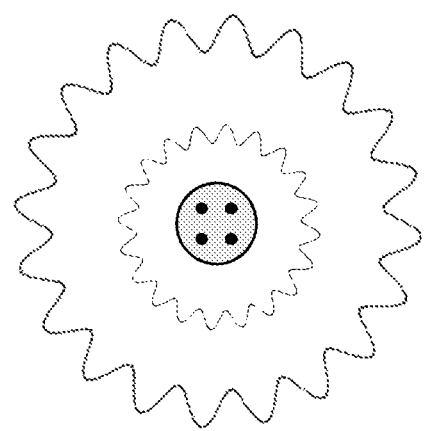
FIG. 1 depicts an example of a diagram representative of a heating element of a charge port defroster.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present embodiments may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, a charge port defroster may prevent the charge port cover from freezing to the vehicle and prevent the charger freezing to the vehicle. The charge port defroster may be enabled while the vehicle is traveling to a charging station or while the vehicle is being charged. The charge port defroster may be enabled based on a cold weather condition that is capable of freezing the charge port cover to the vehicle or freezing the charger to the vehicle. The charge port defroster may determine that the vehicle is traveling to a charging station based on a GPS coordinate or location entered into the navigation unit at the vehicle.

The charge port defroster may include a heating element coupled to an electric vehicle at the area proximate to the charge port. The charge port may be configured to be covered by a charge port cover. The charge port cover may be configured to cover and protect the charge port. The charge port cover may be coupled to the vehicle with a hinge. The powering of the heating element of the charge port defroster may be enabled by a controller at the vehicle. The controller may determine whether the charge port defroster is to be powered based on a GPS sensor, a temperature sensors, a navigation vehicle sensor, a charging sensor, and/or a charge of a battery onboard the vehicle.

An exemplary system may include a charge port integrated into the vehicle and configured to power the vehicle. The charge port cover may be coupled to the vehicle with a hinge. The charge port cover may be configured to cover the charge port. The heating element may be located proximate to the charge port. The controller for the charge port defroster may be communicatively coupled to the charge port and the heating element. The controller may be configured to determine whether the vehicle is in an environment that can satisfy or is capable of satisfying a temperature threshold. The temperature threshold may be indicative of a cold weather condition. The controller may operate the heating element to be powered in response to determining the vehicle is in the environment that can satisfy or is capable of satisfying the temperature threshold. The cold weather condition may be capable of producing icy conditions that interfere with charging the vehicle, accessing the charge port, or removing a charger from the charge port.

The methods, systems, apparatuses, and non-transitory storage mediums described herein include operating the heating element to be powered in response to satisfying conditions. The various exemplary embodiments also operate a first heating element and a second heating element to be powered depending on a temperature threshold being satisfied.

Referring now to the corresponding drawings, FIG. 1 depicts an example of a diagram representative of a heating element of a charge port defroster. A vehicle may include a charge port defroster. The charge port defroster includes a heating element situated around the charge port. The heating element may be selectively activated by the controller.

The heating element may include a tine, a ribbon, and/or the like. The heating element may be proximate to the charge port. The heating element may surround or be wrapped around the charge port. The heating element may be integrated into the charge port and may be integrated below a surface of the charge port. The heating element may be situated below the surface of the charge port opening. The heating element may have a wave-like or a zig-zag pattern. The heating element may extend radially around the charge port. The charge port may be the center portion of the area created by the heating element.

In some embodiments, a first heating element and a second heating element may surround the charge port. The first heating element may be closer to the charge port than the second heating element and the first heating element may be nested inside the second heating element. The first heating element may be powered during cold weather conditions and the second heating element may be powered during more severe cold weather conditions. The controller may selectively activate the first heating element and the second heating element based on temperature thresholds.

Figure 2:
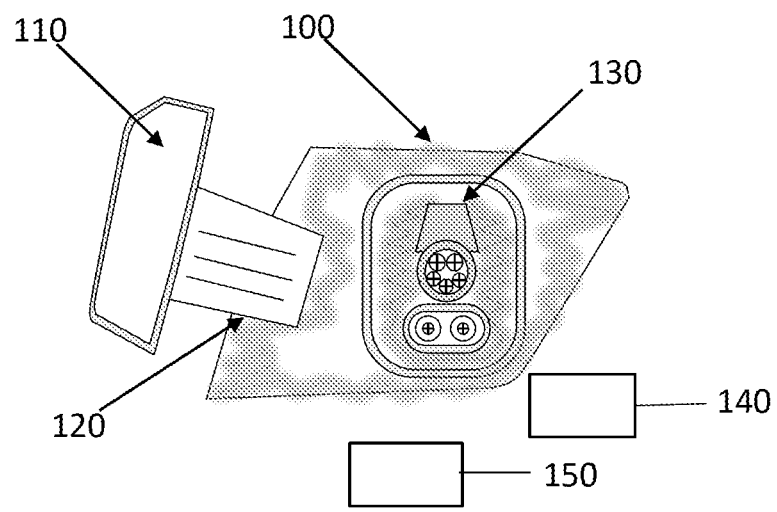
FIG. 2 depicts an example of a diagram representative of a charge port with a charge port cover with two heating elements.

FIG. 2 depicts an example of a diagram representative of a charge port 100 with a charge port cover 110 with two heating elements. The charge port area may include the charge port cover, the charge port, the heating element surrounding the charge port, and a hinge 120 that couples the charge port cover to the vehicle. In some embodiments, the charge port also suitably includes a temperature sensor 130.

The charge port cover may be configured to cover the charge port. The charge port cover may be configured to selectively expose and cover the charge port. The charge port cover may form an exterior portion of the vehicle. The charge port cover may include a hinge configured to couple the charge port cover to the vehicle. The hinge 120 may rotate the charge port cover towards and away from the vehicle. In some embodiments, the hinge may slide the charge port cover inside the vehicle to expose the charge port. The charge port cover 110 may be configured at least partially cover (e.g. cover at least 30, 40, 50, 60 or 70 percent surface area) or substantially cover (e.g. at least 80, 80, 95 or in the case of completely 100 percent surface area) the heating element. In some embodiments, the charge port cover edge is proximate to the heating element. In some embodiments, the heating element is proximate to the hinge and the heating element is situated around an edge proximate to a charge port cover edge.

In some embodiments, the charge port cover may be configured to cover the first heating element and the second heating element. The first heating element may be proximate to the charge port and the second heating element may be proximate to the outside perimeter or edge of the charge port area. For example, the second heating element in the charge port area may be configured to align with the edges of the charge port cover. Aligning the second heating element to the edges of the charge port cover increases the likelihood that the charge port cover remains defrosted during cold weather conditions. In some embodiments, the second heating element may be aligned near the hinge of the charge port cover. Aligning the second heating element to the hinge of the charge port cover increases the likelihood that the charge port cover opens during cold weather conditions.

The charge port cover area may include an A-surface trim panel and a drain port for water run-off. The heating element may be included on a different surface than the A-surface trim panel. Additionally, and/or alternatively, the heating element may be embedded within the charge port cover area. For example, the first heating element may be embedded into the A-surface trim panel and the second heating element may be exposed at the edges of the different surface surrounding the A-surface trim panel. In another example, the first heating element may be exposed at the edges of the A-surface trim panel and the second heating element may be embedded at the edges of the different surface surrounding the A-surface trim panel.

As discussed, the present suitably comprise other elements and units in conjunction with a present charge port defrosters systems including without limitation a global positioning system (GPS) 140 and/or other sensors 150 such as a power sensor to measure power at a battery as further discussed below, for example powering the heating element of the charge port cover.

Figure 3:
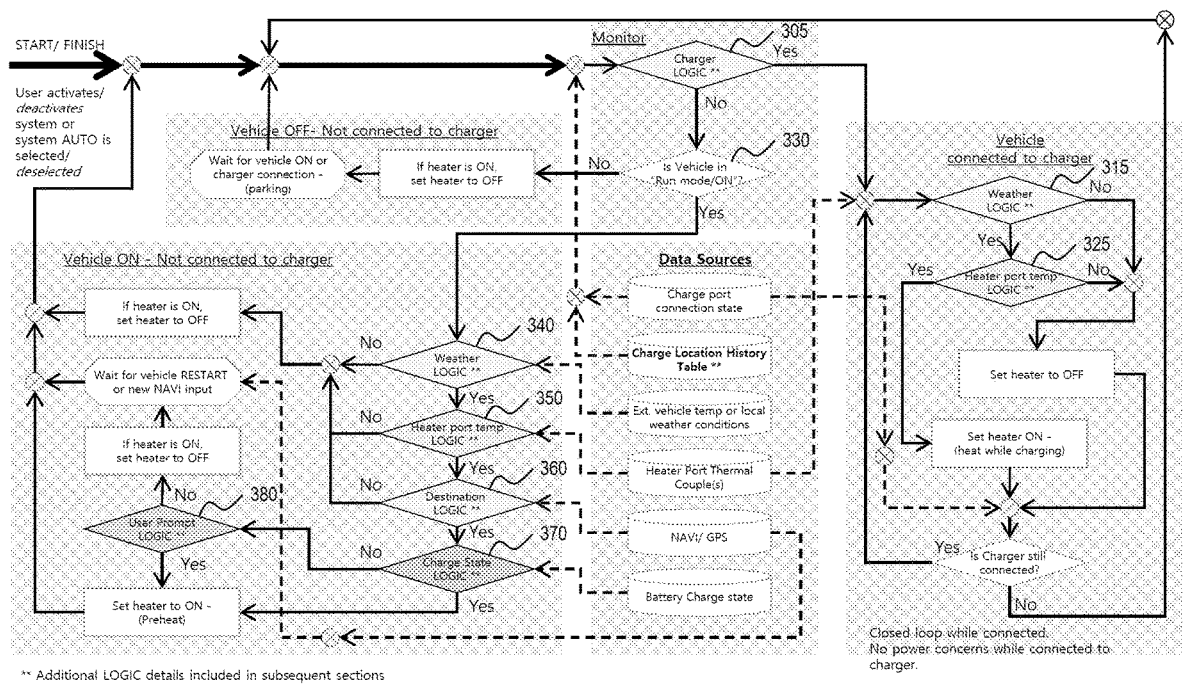
FIG. 3 depicts another example of a flowchart for determining whether the charge port defroster is to be powered.

FIG. 3 depicts an example of a flowchart for determining whether the charge port defroster is to be powered. The method may be enabled by determining whether an automatic control is selected or that the user has deactivated an override function. The flowchart may rely on data sources to determine whether the charge port is to be powered. The data sources may include databases storing a charge port connection state, a charge location history table, an exterior vehicle temperature, local weather conditions, a heater port thermal couple, a navigation/GPS data, and a battery charge state. A controller at the vehicle may be configured to determine whether the charge port defroster is to be powered based on the conditions. The flowchart logic may bifurcate depending on whether a charger is connected to the vehicle.

At 305, the controller may be configured to determine whether the charger is plugged into the vehicle. If the charger is plugged into the vehicle, then the controller logic may proceed to 315. If the charger is not plugged into the vehicle, then the controller logic may proceed to 330.

At 315, the controller may be configured to determine whether a cold weather condition satisfies a cold weather threshold. The cold weather condition may be capable of producing icy conditions that interfere with charging the vehicle, accessing the charge port, or removing a charger from the charge port. If the cold weather threshold is satisfied, then the controller logic may proceed to 325. If the cold weather threshold is not satisfied, the controller is configured to operate the charge port defroster to be turned off.

At 325, the controller may be configured to determine whether the temperature satisfies a temperature threshold at the charge port. If the temperature threshold is satisfied, then the controller is configured to enable the charge port defroster to be turned on. If the temperature threshold is not satisfied, the controller is configured to operate the charge port defroster to be turned off.

At 330, the controller had previously determined that the charger is not plugged into the charge port. If the vehicle is not turned on, then the controller is configured to operate the charge port defroster to be turned off. Afterwards, the controller may be configured to monitor the vehicle and the controller logic may proceed to 305 if the vehicle is turned on or the controller determines the charger is connected to the vehicle. If the vehicle is turned on, then the controller logic may proceed to 340.

At 340, the controller may be configured to determine whether a cold weather condition satisfies a cold weather threshold. If the cold weather threshold is satisfied, then the controller logic may proceed to 350. Otherwise, the controller may be configured to operate the charge port defroster to be turned off.

At 350, the controller may be configured to determine whether a temperature satisfies a temperature threshold at the charge port. If the temperature threshold is satisfied, then the controller logic may proceed to 360. If the temperature threshold is not satisfied, then the controller is configured to operate the charge port defroster to be turned off.

At 360, the controller may be configured to determine whether a location of the vehicle or a destination of the vehicle includes a charging station. If a charging station is included at the location or the destination, then the controller logic may proceed to 370. If a charging station is not included at the location or the destination, then the controller may be configured to operate the charge port defroster to be turned off.

At 370, the controller may be configured to determine whether a battery power level satisfies a charge threshold. If the battery power level satisfies the charge threshold, then the controller proceeds to enable the charge port defroster to be powered. If the battery power level fails to satisfy the charge threshold, then the controller logic may proceed to 380.

At 380, the controller may be configured to determine whether a user input is received. The controller may be configured to present a prompt to the user in response to the battery power level failing to satisfy the charge threshold. If the user input is received, then the controller may be configured to operate the charge port defroster to be turned on. If the user input is not received, then the controller may operate the charge port defroster to be turned off. The controller may be configured to monitor for either the vehicle to restart or a new navigation input before presenting the prompt again.

Figure 4:
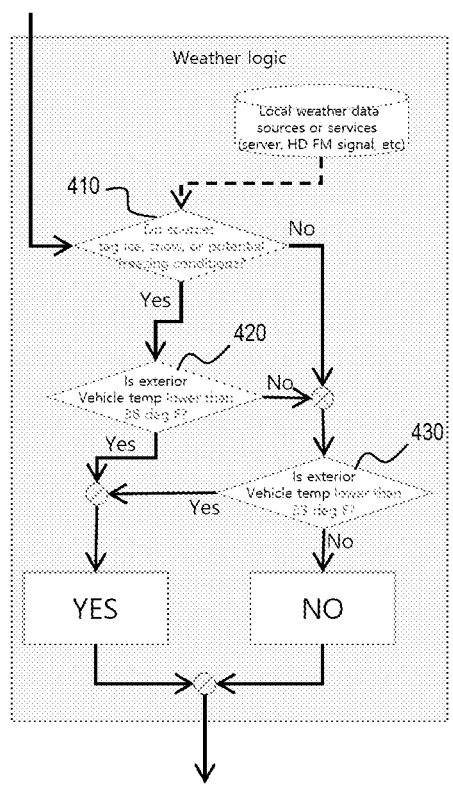
FIG. 4 depicts another example of a flowchart for determining whether the charge port defroster is to be powered based on a weather condition.

FIG. 4 depicts an example of a flowchart for determining whether the charge port defroster is to be powered based on a weather condition. The controller may be communicatively coupled to an external data source. The controller may be configured to gather information from the external data source. The external data source may include local weather data source or wireless service to determine whether the weather condition is satisfied. Examples of wireless sources include a paired smart device with weather information, a FM broadcast, a V2V communication, a V2X communication, a wirelessly transmitted weather broadcast, and/or the like. The controller may be communicatively coupled to a temperature sensor (e.g. 130) configured to gather data from a temperature sensor. The temperature sensor may be located at the charge port or elsewhere coupled to the vehicle.

At 410, the controller may be configured to determine whether the vehicle is in an environment that can satisfy or is capable of satisfying a temperature threshold based on an external source. The controller may be communicatively coupled to an external data source, such as a local weather data source or wireless service to determine whether the weather condition is satisfied. In some embodiments, the controller may be configured to receive weather information from at least one of a paired smart device with weather information, a FM broadcast, a V2V communication, a V2X communication, a wirelessly transmitted weather broadcast, and/or the like. The controller may be configured to determine whether the vehicle is in an environment that can satisfy or is capable of satisfying a temperature threshold based on the external source. If the controller determines the vehicle is in an environment that can satisfy or is capable of satisfying the temperature threshold, then the controller proceeds to 420. If the controller determines the vehicle is not in an environment that can satisfy or is capable of satisfying the temperature threshold, then the controller proceeds to 430.

At 420, the controller may determine whether a temperature outside the vehicle satisfies a first temperature threshold based on the temperature sensor. For example, the controller may determine whether the exterior vehicle temperature is lower than a first temperature threshold of 38 degrees Fahrenheit. If the exterior vehicle temperature satisfies the first temperature threshold, then the controller may be configured to operate a battery or a charger selectively coupled to the charge port to power the charge port defroster. Additionally and/or alternatively, the controller logic may proceed to 350. If the exterior vehicle temperature does not satisfy the first temperature threshold, then the controller may be configured to operate the charge port defroster to be turned off.

At 430, the controller had previously determined that the vehicle is not in an environment that can satisfy or is capable of satisfying the temperature threshold. The controller may be configured to determine whether a temperature outside the vehicle satisfies the second temperature threshold based on the temperature sensor. For example, the controller may determine whether the exterior vehicle temperature is lower than a second temperature threshold of 33 degrees Fahrenheit. If the exterior vehicle temperature satisfies the second temperature threshold, then the controller may be configured to operate a battery or a charger selectively coupled to the charge port to power the charge port defroster. The controller may enable the charge port defroster regardless of data from an external source if the second temperature threshold is satisfied. If the exterior vehicle temperature does not satisfy the second temperature threshold, then the controller may operate the charge port defroster to be turned off. In some embodiments, determining whether the vehicle is in the environment that can satisfy or is capable of satisfying the temperature threshold is based on the temperature sensor.

Figure 5:
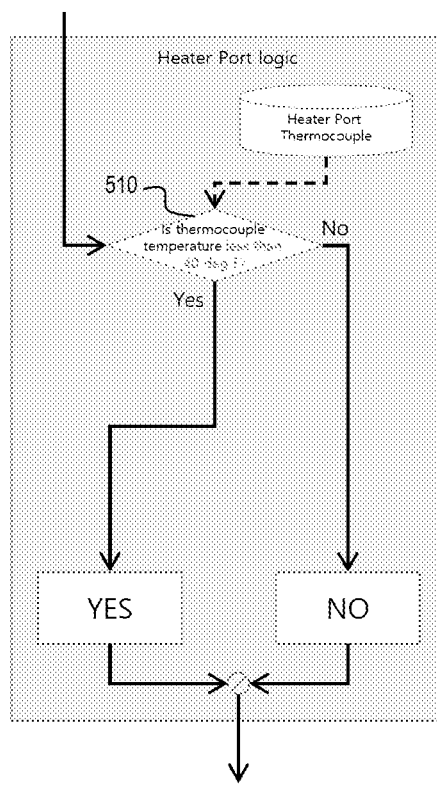
FIG. 5 depicts another example of a flowchart for determining whether the charge port defroster is to be powered based on a temperature sensor.

FIG. 5 depicts another example of a flowchart for determining whether the charge port defroster is to be powered based on a temperature sensor. The controller may be communicatively coupled to a temperature sensor and configured to gather data from a temperature sensor. The temperature sensor may be located at the charge port.

At 510, the controller may determine whether a temperature at the charge port satisfies a thermocouple temperature threshold based on the temperature sensor at the charge port. For example, the controller may determine whether the thermocouple temperature is lower than a thermocouple temperature threshold of 40 degrees Fahrenheit. If the thermocouple temperature satisfies the thermocouple temperature threshold, then the controller may be configured to operate a battery or a charger selectively coupled to the charge port to power the charge port defroster. If the thermocouple temperature does not satisfy the thermocouple temperature threshold, then the controller may operate the charge port defroster to be turned off. In some embodiments, determining whether the vehicle is in the environment that can satisfy or is capable of satisfying the temperature threshold is based on the temperature sensor at the charge port.

Figure 6:
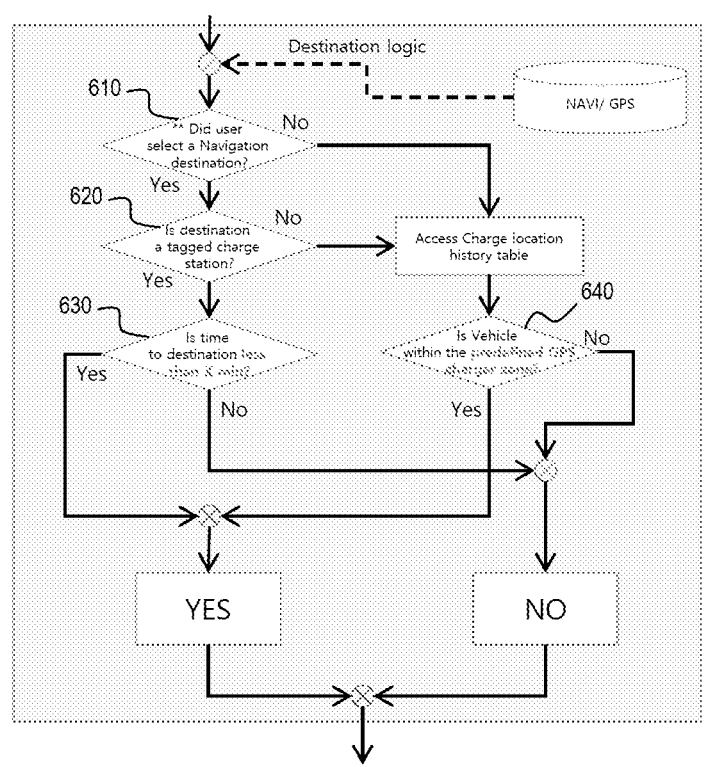
FIG. 6 depicts another example of a flowchart for determining whether the charge port defroster is to be powered based on at least one of a location of the vehicle using the GPS or a destination of the vehicle based on a navigation system.

FIG. 6 depicts another example of a flowchart for determining whether the charge port defroster is to be powered based on at least one of a location of the vehicle using the GPS or a destination of the vehicle based on a navigation system. The controller may be communicatively coupled to an onboard data source. The controller may be configured to gather information from the onboard data source. The onboard data source may include a navigation unit or a GPS unit. The navigation unit may determine a location to which the vehicle is traveling and whether the location includes a charging station. The GPS unit includes a current location of the vehicle and whether the current location includes a charging station. The controller may be communicatively coupled to a global positioning system and configured to gather data from the global positioning system. The controller may be communicatively coupled to the navigation unit and configured to gather data from the navigation unit.

At 610, the controller is configured to determine whether a destination was selected at the navigation unit. If a navigation destination was selected, then the controller proceeds to 620. If a destination was not selected, then the controller accesses a charge location history table and proceeds to 640.

At 620, the controller determines whether the selected destination includes a tagged charge station at the destination. If the selected destination includes a charge station, then the controller logic proceeds to 630. If the selected destination does not include a charge station, then the controller accesses a charge location history table and the controller logic proceeds to 640. The navigation system may be configured to track whether the charging stations are located at a set of destinations visited by the vehicle. The navigation system may be configured to store the charge location history table.

At 630, the controller may be configured to determine whether a time to the destination satisfies a time threshold. In some embodiments, the controller may be configured to determine whether the vehicle is to charge within a time threshold based on at least one of the location of the vehicle or the destination of the vehicle. The time threshold may be indicative of a time in which the charging station is to be selectively coupled to the charging port. For example, if the time to the destination is less than the time threshold, then the controller may be configured to operate a battery or a charger selectively coupled to the charge port to power the charge port defroster. If the time to the destination is greater than the time threshold, then the controller may operate the charge port defroster to be turned off. In some embodiments, the time threshold is adjusted based on a temperature determined by a temperature sensor.

At 640, the controller may be configured to determine whether the vehicle is within a predefined GPS charger zone. A predefined GPS charger zone is a GPS coordinate that has been previously identified as a coordinate including a charging station. The navigation system may be configured to store the predefined GPS charger zones. If the vehicle is within the predefined GPS charger zone, then the controller may be configured to operate a battery or a charger selectively coupled to the charge port to power the charge port defroster. Additionally, and/or alternatively, the controller logic may proceed to 370. If the vehicle is not within a predefined GPS charger zone, then the controller may be configured to operate the charge port defroster to be turned off.

Figure 7:
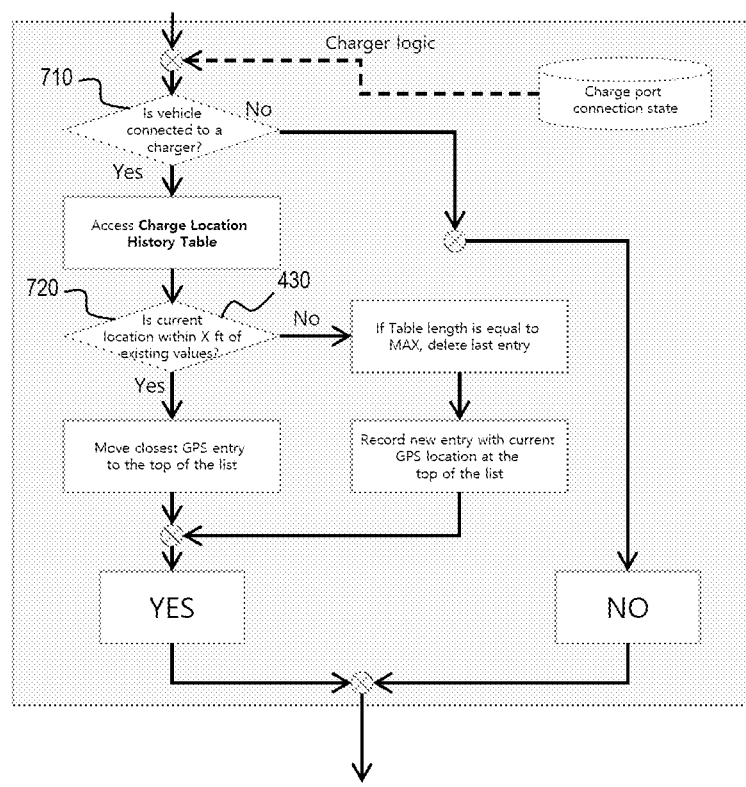
FIG. 7 depicts another example of a flowchart for determining whether the charge port defroster is to be powered based on a location of the vehicle and whether the vehicle is connected to a charger.

FIG. 7 depicts another example of a flowchart for determining whether the charge port defroster is to be powered based on a location of the vehicle and whether the vehicle is connected to a charger. The controller may be communicatively coupled to an onboard data source. The controller may be configured to gather information from the onboard data source. The onboard data source may include a charge port connection sensor. The charge port connection sensor may be configured to determine whether the vehicle is connected to a charger. The controller may be communicatively coupled to the charge port connection sensor and configured to gather data from the charge port connection sensor.

At 710, the controller is configured to determine whether the vehicle is connected to a charger of a charging station. If the controller is connected to a charger, the controller is configured to access a charge location history table stored at the navigation unit and the controller logic may proceed to 720. If the controller is not connected to the charger, then the controller is configured to determine whether the vehicle is turned on at step 330.

At 720, the controller may be configured to determine whether the current location of the vehicle is within a distance threshold of one of the entries from the charge location history table. If the vehicle is within the distance threshold of one of the entries from the charge location history table, then the controller is configured to move the closest location entry to the top of the charge location history table. The controller logic then may then proceed to step 315. If the controller is not within the distance threshold of one of the entries from the charge location history table, then the controller is configured to add the current location of the vehicle to the charge location history table. If the length of the charge location history table has reached a maximum length, the least recent entry may be removed from the charge location history table. The controller logic then may then proceed to step 315.

Figure 8:
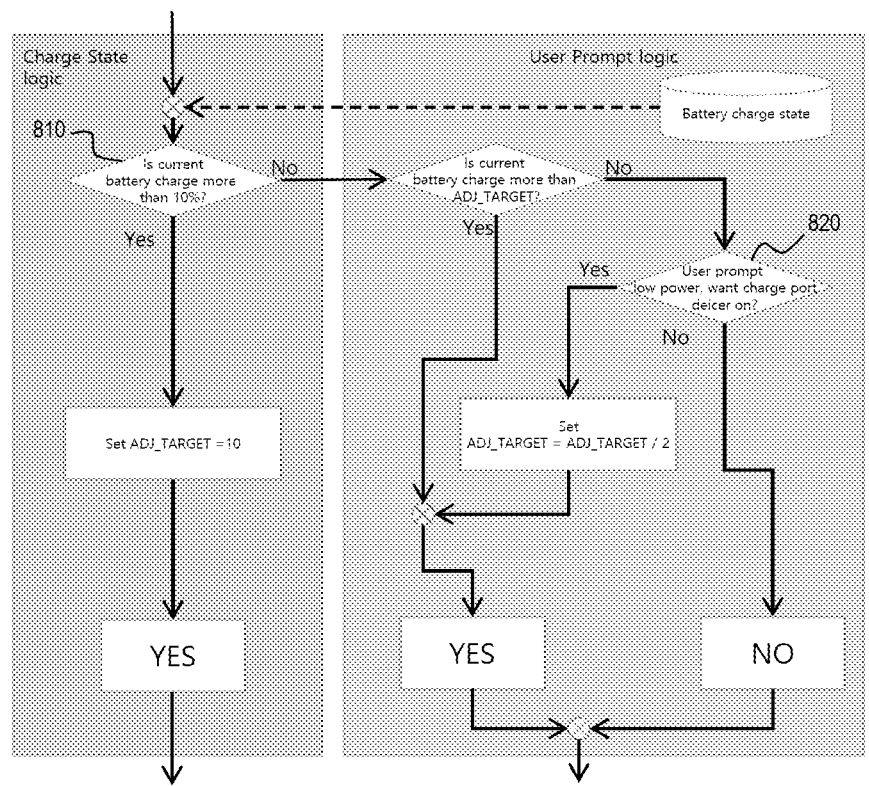
FIG. 8 depicts another example of a flowchart for determining whether the charge port defroster is to be powered based on a battery charge and a user prompt.

FIG. 8 depicts another example of a flowchart for determining whether the charge port defroster is to be powered based on a power threshold at a battery and a user prompt. The controller may be communicatively coupled to an onboard data source. The controller may be configured to gather information from the onboard data source. The onboard data source may include a battery power sensor. The battery power sensor may be configured to determine a battery power level of a battery at the vehicle. The battery at the vehicle may be configured to power the charge port defroster. The controller may be communicatively coupled to the battery and the battery power sensor. The controller may be configured to gather data from the battery power sensor.

At 810, the controller is configured to determine whether the battery power satisfies a power threshold. The power threshold may be indicative of a low power at the battery coupled to the vehicle. In some embodiments, the power threshold may be 10% of the battery's maximum capacity. If the power threshold is satisfied (e.g., the power level exceeds 10%), then the controller may be configured to operate a battery to power the charge port defroster. If the power threshold is not satisfied, then the controller logic proceeds to 820. Additionally, and/or alternatively, the controller logic may proceed to 380 in response to the power threshold not being satisfied (e.g., the power level is below 10%).

At 820, the controller may be configured to present a prompt to the user to determine whether the charge port defroster is to be turned on. In response to receiving a response confirming the charge port defroster is to be turned on, the controller may be configured to operate the battery to power the charge port defroster. In response to receiving a response that the charge port defroster is not to be turned on, then the controller may operate the charge port defroster to be turned off.

In some embodiment, the power threshold may be adjustable by the user. For example, the power threshold may be reduced in response to the user confirming that the charge port defroster is to be turned on after presenting a prompt to the user to determine whether the charge port defroster is to be turned on.

Figure 9:
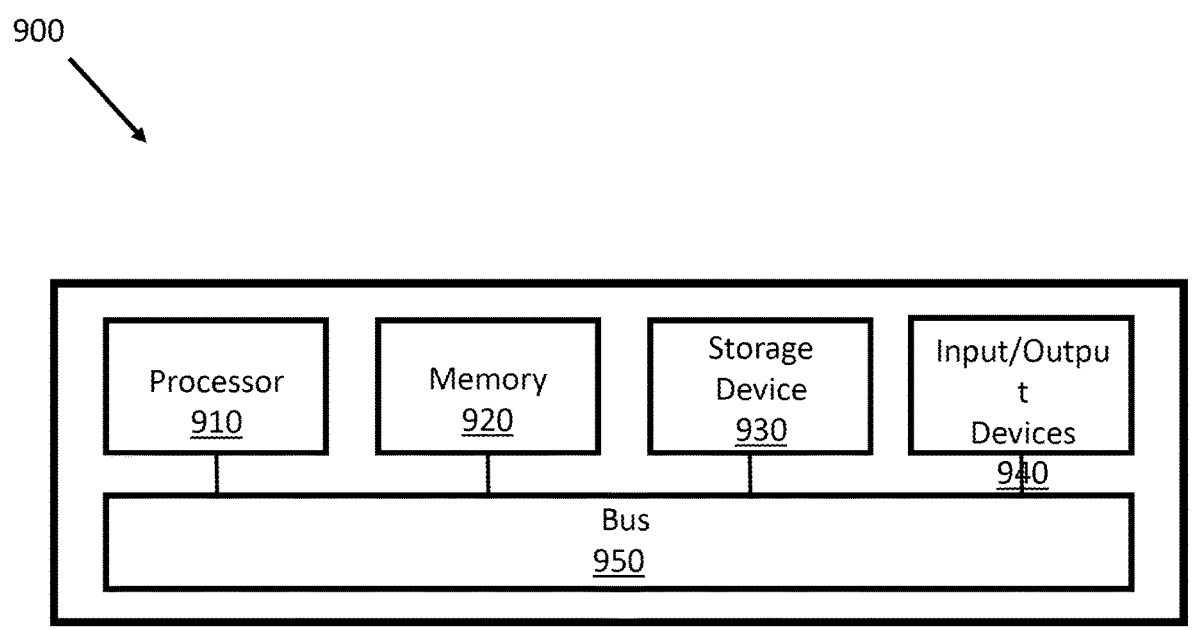
FIG. 9 depicts a block diagram illustrating a computing system consistent with implementations of the current subject matter.

FIG. 9 depicts a block diagram illustrating a computing system consistent with implementations of the current subject matter. Referring to FIGS. 1-9, the computing system 900 may be used for the charge port defroster. For example, the computing system 900 may implement user equipment, a personal computer, or a mobile device.

As shown in FIG. 9, the computing system 900 may include a processor 910, a memory 920, a storage device 930, and an input/output device 940. The processor 910, the memory 920, the storage device 930, and the input/output device 940 may be interconnected via a system bus 950. The processor 910 is capable of processing instructions for execution within the computing system 900. Such executed instructions may implement one or more components of, for example, charge port defrosters. In some exemplary embodiments, the processor 910 may be a single-threaded processor. Alternately, the processor 910 may be a multi-threaded processor. The processor 910 is capable of processing instructions stored in the memory 920 and/or on the storage device 930 to display graphical information for a user interface provided via the input/output device 940.

The memory 920 is a non-transitory computer-readable medium that stores information within the computing system 900. The memory 920 may store data structures representing configuration object databases, for example. The storage device 930 is capable of providing persistent storage for the computing system 900. The storage device 930 may be a floppy disk device, a hard disk device, an optical disk device, or a tape device, or other suitable persistent storage means. The input/output device 940 provides input/output operations for the computing system 900. In some exemplary embodiments, the input/output device 940 includes a keyboard and/or pointing device. In various implementations, the input/output device 940 includes a display unit for displaying graphical user interfaces.

According to some exemplary embodiments, the input/output device 940 may provide input/output operations for a network device. For example, the input/output device 940 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 900 may be used to execute various interactive computer software applications that may be used for organization, analysis and/or storage of data in various formats. Alternatively, the computing system 900 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 940. The user interface may be generated and presented to a user by the computing system 900 (e.g., on a computer screen monitor, etc.).

The technical advantages presented herein may result in preventing the charge port cover from freezing to the vehicle and preventing the charger freezing to the vehicle. The charge port defroster may be enabled while the vehicle is traveling to a charging station or while the vehicle is being charged. The charge port defroster may be enabled based on a cold weather condition that is capable of freezing the charge port cover to the vehicle or freezing the charger to the vehicle. The charge port defroster may determine that the vehicle is traveling to a charging station based on a GPS coordinate or location entered into the navigation unit at the vehicle.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
   a charge port integrated into a vehicle and configured to power the vehicle;
   a charge port cover coupled to the vehicle, the charge port cover configured to at least partially cover the charge port;

a heating element located proximate to the charge port and the charge port cover;
a controller communicatively coupled to the heating element, the controller configured to:
determine whether the vehicle is in an environment that can satisfy a temperature threshold, the temperature threshold indicative of a cold weather condition; and
in response to determining the vehicle is in the environment that can satisfy the temperature threshold, operate the heating element to be powered; and
a global positioning system (GPS);
wherein the controller is communicatively coupled to the GPS and further configured to:
determine at least one of a location of the vehicle using the GPS or a destination of the vehicle based on a navigation system, the at least one of the location or the destination including a charging station; and
in response to determining the vehicle is in the environment that can satisfy the temperature threshold and determining the at least one of the location of the vehicle or the destination of the vehicle is associated with the charging station, operate at least one of a battery or a charger selectively coupled to the charge port to power the heating element;
wherein the controller is additionally configured to:
determine the vehicle is to charge within a time threshold based on at least one of the location of the vehicle or the destination of the vehicle, the time threshold indicative of a time in which the charging station is to be selectively coupled to the charging port, and
in response to determining the vehicle is in the environment that can satisfy the temperature threshold and determining the vehicle is to charge within the time threshold, operate at least one of the battery or the charger selectively coupled to the charge port to power the heating element;
wherein the time threshold is adjusted based on a temperature determined by a temperature sensor.

2. The system of claim 1, wherein the heating element is situated around an edge proximate to a charge port cover edge, wherein the heating element is proximate to the hinge, wherein the heating element surrounds the charge port, and wherein the cold weather condition is capable of producing icy conditions that interfere with at least one of charging the vehicle, accessing the charge port, or removing a charger from the charge port.

3. The system of claim 1, the system further comprising:
a temperature sensor coupled to the vehicle;
wherein the controller is communicatively coupled to the temperature sensor, the controller further configured to:
determine a temperature satisfies the temperature threshold based on the temperature sensor, the temperature threshold indicative of the temperature outside the vehicle; and
in response to determining the temperature satisfies the temperature threshold, operate at least one of a battery or a charger selectively coupled to the charge port to power the heating element,
wherein determining the vehicle is in the environment that can satisfy the temperature threshold is based on the temperature sensor.

4. The system of claim 1, wherein determining whether the vehicle is in the environment that can satisfy the temperature threshold is based on an external source including at least one of a wirelessly transmitted weather broadcast, a V2V communication, or a V2X communication.

5. The system of claim 1, the system further comprising:
a battery having a power; and
a power sensor configured to measure power at the battery,
wherein the controller is communicatively coupled to the battery and the power sensor, the controller further configured to:
determine the power satisfies a power threshold based on the power sensor, the power threshold indicative of the power in the battery; and
in response to determining the vehicle is in the environment that can satisfy the temperature threshold and determining the power satisfies the power threshold, operate at least one of the battery or a charger selectively coupled to the charge port to power the heating element.

6. The system of claim 1, wherein the navigation system is configured to track whether charging stations are located at a set of destinations visited by the vehicle.

7. The system of claim 1, the system further comprising:
a battery having a power; and
a power sensor configured to measure power at the battery,
wherein the controller is communicatively coupled to the battery and the power sensor, the controller further configured to:
determine the power satisfies a power threshold based on the power sensor, the power threshold indicative of a low power in the battery;
in response to the power satisfying the power threshold, generating a prompt to determine whether the heating element is to be powered;
receiving a response to the prompt, the response indicative that the heating element is to be powered; and
in response to determining the vehicle is in the environment that can satisfy the temperature threshold and receiving the response to the prompt, operate at least one of the battery or a charger selectively coupled to the charge port to power the heating element.

8. A non-transitory computer-readable storage medium storing instructions that, when executed by a processor, cause the processor to perform operations comprising:
determine whether a vehicle is in an environment that can satisfy a temperature threshold, the temperature threshold indicative of a cold weather condition; and
in response to determining the vehicle is in the environment that can satisfy the temperature threshold, operate a heating element to be powered, the heating element located proximate to a charge port, the charge port coupled to the vehicle and configured to power the vehicle, and the charge port configured to be covered by a charge port cover coupled to the vehicle with a hinge;
wherein the operations further comprise:
determining at least one of a location of the vehicle using a global positioning system (GPS) or a destination of the vehicle based on a navigation system, the at least one of the location or the destination including a charging station; and
in response to determining the vehicle is in the environment that can satisfy the temperature threshold and determining the at least one of the location of the vehicle or the destination of the vehicle, operating at least one of a battery or a charger selectively coupled to the charge port to power the heating element;

wherein the operations additionally comprise:
determining the vehicle is to charge within a time threshold based on at least one of the location of the vehicle or the destination of the vehicle, the time threshold indicative of a time in which the charging station is to be selectively coupled to the charging port,
in response to determining the vehicle is in the environment capable of satisfying the temperature threshold and determining the vehicle is to charge within the time threshold, operating at least one of the battery or the charger selectively coupled to the charge port to power the heating element;
wherein the time threshold is adjusted based on a temperature determined by a temperature sensor.

9. The non-transitory computer-readable storage medium of claim 8, wherein the heating element is situated around an edge proximate to a charge port cover edge, wherein the heating element is proximate to the hinge, wherein the heating element surrounds the charge port, and wherein the cold weather condition is capable of producing icy conditions that interfere with at least one of charging the vehicle, accessing the charge port, or removing a charger from the charge port.

10. The non-transitory computer-readable storage medium of claim 8, the operations further comprising:
determine a temperature satisfies the temperature threshold based on a temperature sensor, the temperature threshold indicative of the temperature outside the vehicle; and
in response to determining the temperature satisfies the temperature threshold, operate at least one of a battery or a charger selectively coupled to the charge port to power the heating element,
wherein determining the vehicle is in the environment that can satisfy the temperature threshold is based on the temperature sensor.

11. The non-transitory computer-readable storage medium of claim 8, wherein determining whether the vehicle is in the environment that can satisfy the temperature threshold is based on an external source including at least one of a wirelessly transmitted weather broadcast, a V2V communication, or a V2X communication.

12. The non-transitory computer-readable storage medium of claim 8, the operations further comprising:
determine the power satisfies a power threshold based on a power sensor configured to measure power at a battery, the power threshold indicative of the power in the battery; and
in response to determining the vehicle is in the environment capable of satisfying the temperature threshold and determining the power satisfies the power threshold, operate at least one of the battery or a charger selectively coupled to the charge port to power the heating element.

13. The non-transitory computer-readable storage medium of claim 8, wherein the navigation system is configured to track whether charging stations are located at a set of destinations visited by the vehicle.

14. A system comprising:
a charge port integrated into a vehicle and configured to power the vehicle;
a charge port cover coupled to the vehicle with a hinge, the charge port cover configured to cover the charge port;
a first heating element located proximate to the charge port;
a second heating element located proximate to the hinge;
a controller communicatively coupled to the charge port and the heating element, the controller configured to:
determine whether the vehicle is in an environment capable of satisfying a temperature threshold, the temperature threshold indicative of a cold weather condition; and
in response to determining the vehicle is in the environment capable of satisfying the temperature threshold, powering the first heating element and the second heating element; and
a global positioning system (GPS);
wherein the controller is communicatively coupled to the GPS and further configured to:
determine at least one of a location of the vehicle using the GPS or a destination of the vehicle based on a navigation system, the at least one of the location or the destination including a charging station; and
in response to determining the vehicle is in the environment that can satisfy the temperature threshold and determining the at least one of the location of the vehicle or the destination of the vehicle is associated with the charging station, operate at least one of a battery or a charger selectively coupled to the charge port to power the heating element;
wherein the controller is additionally configured to:
determine the vehicle is to charge within a time threshold based on at least one of the location of the vehicle or the destination of the vehicle, the time threshold indicative of a time in which the charging station is to be selectively coupled to the charging port, and
in response to determining the vehicle is in the environment that can satisfy the temperature threshold and determining the vehicle is to charge within the time threshold, operate at least one of the battery or the charger selectively coupled to the charge port to power the heating element;
wherein the time threshold is adjusted based on a temperature determined by a temperature sensor.

* * * * *